T. A. COOPER.
MICROMETER ATTACHMENT FOR CALIPERS AND LIKE TOOLS.
APPLICATION FILED FEB. 24, 1916.
1,198,702.
Patented Sept. 19, 1916.
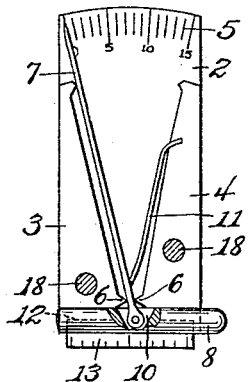
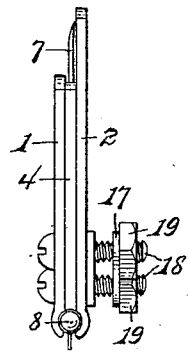
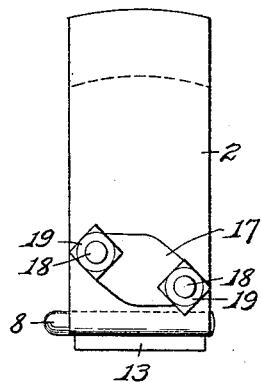
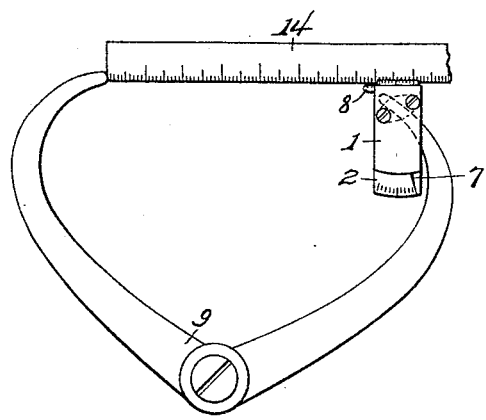
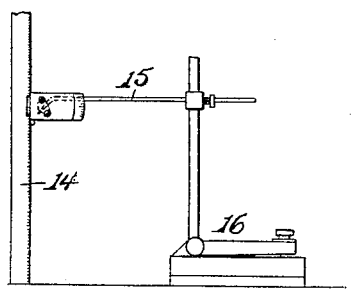
INVENTOR
Thomas A. Cooper
By
ATTORNEY

UNITED STATES PATENT OFFICE.

THOMAS AINSWORTH COOPER, OF YOUNGSTOWN, OHIO.

MICROMETER ATTACHMENT FOR CALIPERS AND LIKE TOOLS.

1,198,702.     Specification of Letters Patent.     Patented Sept. 19, 1916.

Application filed February 24, 1916. Serial No. 80,178.

*To all whom it may concern:*

Be it known that I, THOMAS AINSWORTH COOPER, a subject of the King of England, and resident of Youngstown, county of Mahoning, and State of Ohio, have invented certain new and useful Improvements in Micrometer Attachments for Calipers and like Tools, of which the following is a specification.

This invention relates broadly to micrometer calipers, and specifically to an attachment for calipers, surface gages and the like, whereby micrometer readings may be obtained.

The primary object of the invention is to provide a simple and inexpensive device for application to calipers, surface gages, and tools of like character, which embodies a graduated scale and an indicator, the latter being associated with a spring-held contact member whose point constitutes one of the caliper points, slight movement of said point being definitely multiplied by said indicator and indicated on said scale in readily readable form.

A further object is to provide a device of the character mentioned which includes a small movable vernier or an alidade having a vernier scale thereon whereby fractional parts of the subdivisions of a standard mechanic's rule or scale may be obtained.

With these and other objects in view, the invention resides in the features of construction, arrangement of parts and combination of elements which will hereinafter be exemplified, reference being had to the accompanying drawings, in which—

Figure 1 is a sectional elevation of the invention; Fig. 2 is a side elevation of the same; Fig. 3 is an elevation of the under side of the same; Fig. 4 is a top plan view of the invention applied to a caliper and illustrating the use of the vernier; and Fig. 5 is an elevation of a surface gage equipped with the invention.

Referring to said drawings, in which like designating characters distinguish like parts throughout the several views—1 and 2 indicate, respectively, the flat top and bottom plates of a substantially rectangular casing, said plates being separated by a pair of interposed oppositely disposed distance pieces 3 and 4. Said plates 1 and 2 are of unequal length and are relatively so disposed that their rear ends are flush, or practically so, one with the other, while the front end of the longer bottom plate 2 projects forward beyond the corresponding end of the top plate 1, and the upper face of said projecting front end carries thereon a graduated scale 5, as shown. The distance pieces 3 and 4 are fixed upon the plate 2 and extend forward a suitable distance from near the rear end of said plate. The inner edge of each distance piece is suitably inclined, as shown in Fig. 1, and formed on said inclined edge at a point closely adjacent to the rear end thereof is a laterally projecting pointed spike or barb 6 which constitutes a fulcrum for a pivoted needle or indicator 7, as will hereinafter be explained. Slidably mounted between said plates 1 and 2 at the rear end of the latter, and preferably abutting the adjacent ends of the distance pieces, is a transversely disposed pin or contact member 8 having one end projected outward to form a contact point which is designed to coact with the point of the arm of a caliper 9 opposite that to which the casing is attached. Said pin 8 has a recess 10 formed therein at a suitable point intermediate its ends, and pivoted within said recess is an end of the indicator 7 hereinbefore mentioned.

The spikes 6 of the distance pieces 3 and 4 are disposed directly opposite each other and have their points separated a distance but slightly greater than the thickness of that portion of the indicator located therebetween, so that any movement however slight, imparted through said pin 8 to the rear end of said indicator will be communicated in multiplied extent to the opposite end of said indicator. A suitable spring, as 11, is interposed between the indicator 7 and the distance piece 4 for normally maintaining the former inclined against the opposite distance piece wherein it stands at zero, and also for holding the pin 8 in its outwardly thrust position. Rigidly mounted on the pin 8, as by seating in a longitudinal groove or kerf 12 provided in said pin, is a narrow plate 13 having vernier graduations thereon, said plate projecting outward from the rear end of the casing and being designed for use in connection with a standard mechanic's rule or scale 14, as shown in Fig. 4.

The invention hereinbefore described is designed to be detachably mounted upon one arm of a caliper 9, as shown in Fig. 4, upon the arm 15 of a surface gage 16, as shown in Fig. 5, or upon a suitable corresponding part of a scribing block or other tool, as will be readily understood. Suitable clamping means is employed for effecting the attachment, a simple form of clamp being shown for illustrative purposes, said clamp comprising a diagonally disposed bearing plate 17 having its ends loosely received upon bolts or screws 18 which are directed through the casing at points adjacent to the rear end of the latter, said bolts carrying nuts 19 thereon whereby said plate is forced inward to firmly seat upon the arm of the caliper interposed between said plate and the under face of the bottom plate of the casing.

The manner of using the invention will be readily apparent to skilled users of the various tools to which it is applicable.

What is claimed is—

1. A micrometer attachment for calipers and like measuring tools, comprising a casing having a scale thereon, a movable spring-pressed indicating needle disposed within said casing and coöperating with said scale, a transversely movable pin carried by one end of said casing and having a protruding end, said pin having a recess therein in which one end of said needle is pivoted, a pair of opposite inwardly directed spikes formed on said casing adjacent to said pin and constituting fulcrums for said needle, and a vernier scale carried by said pin and projecting outward therefrom through the adjacent end of the casing.

2. A micrometer attachment for calipers and like measuring tools, comprising a pair of plates of unequal lengths, the longer of said plates having a scale thereon, distance pieces interposed between said plates, spikes carried on the opposing faces of said distance pieces adjacent to the rear ends thereof, said spikes being directly opposed to form a space of restricted width therebetween, a transversely movable pin mounted between said plates closely adjacent to said spikes, said pin having a protruding end, a needle disposed between said spikes and adapted to have rocking movement thereon, said needle having one end coöperating with said scale and the other end pivoted to said pin, and a vernier scale carried by said pin.

3. A micrometer attachment for calipers and like measuring tools, comprising a pair of plates of unequal lengths, the longer of said plates having a scale thereon, distance pieces interposed between said plates, spikes carried on the opposing faces of said distance pieces adjacent to the rear ends thereof, said spikes being directly opposed to form a space of restricted width therebetween, a transversely movable pin mounted between said plates closely adjacent to said spikes, said pin having a protruding end and having a longitudinal kerf formed therein, a vernier scale having an edge fitted in said kerf, and a needle coöperating with the first-mentioned scale and having one end pivotally attached to said pin and fulcrumed on said spikes.

4. A micrometer attachment for calipers and like measuring tools, comprising a pair of plates of unequal lengths, one of which has a scale thereon, distance pieces interposed between said plates, spikes carried on the opposing faces of said distance pieces adjacent to the rear ends thereof, said spikes being directly opposed to form a space of restricted width therebetween, a transversely movable pin mounted between the said plates closely adjacent to said spikes, and having a protruding end, a needle disposed between said spikes and adapted to fulcrum thereon, said needle being adapted to coöperate with said scale, said pin having a recess therein in which an end of said needle is pivotally mounted, and a plate having a graduated scale thereon carried by said pin and projecting outwardly from said casing.

In testimony whereof, I affix my signature in presence of two subscribing witnesses.

THOMAS AINSWORTH COOPER.

Witnesses:
THOS. B. ATWOOD,
ROSE N. GREENWALD.

Copies of this patent may be obtained for five cents each, by addressing the "Commissioner of Patents, Washington, D. C."